(12) United States Patent
Engelbrecht et al.

(10) Patent No.: US 7,954,513 B2
(45) Date of Patent: Jun. 7, 2011

(54) SPRAY APPLICATION RATE REGULATING VALVE

(75) Inventors: Joshua Jacob Engelbrecht, Ankeny, IA (US); Richard Allen Humpal, Ankeny, IA (US)

(73) Assignee: Deere & Company, Moline, IL (US)

( * ) Notice: Subject to any disclaimer, the term of this patent is extended or adjusted under 35 U.S.C. 154(b) by 732 days.

(21) Appl. No.: 12/050,211

(22) Filed: Mar. 18, 2008

(65) Prior Publication Data

US 2009/0235999 A1 Sep. 24, 2009

(51) Int. Cl.
*F16K 11/087* (2006.01)
(52) U.S. Cl. .................... 137/625.47; 137/864
(58) Field of Classification Search ............. 137/625.16, 137/625.29, 625.3, 625.32, 625.47, 864; 251/310
See application file for complete search history.

(56) References Cited

U.S. PATENT DOCUMENTS

| | | | | |
|---|---|---|---|---|
| 2,558,260 A | * | 6/1951 | Maky | 251/174 |
| 3,966,119 A | * | 6/1976 | Harter et al. | 237/12.3 B |
| 4,951,711 A | * | 8/1990 | Kunz | 137/625.47 |
| 5,893,393 A | * | 4/1999 | Erdkamp et al. | 137/625.47 |
| 6,932,104 B2 | * | 8/2005 | Anderson et al. | 137/271 |

* cited by examiner

*Primary Examiner* — John Fox

(57) ABSTRACT

A regulator valve includes an inlet coupled for receiving a spray solution delivered by a fixed displacement pump coupled to a solution tank. Located in the valve body so as to divide the solution received at the inlet between a bypass or tank port of the regulator valve, and a boom port is a ball valve in the form of a hollow sphere having a first circular opening in register with said inlet, a second circular opening in register with said boom port and an elongate, wedge-shaped opening in register with said bypass port. The ball valve is mounted for rotation about an axis which is coaxial with the first circular opening and includes a stem coupled to an electric motor for actuating the valve, the motor being coupled for receiving a control signal for causing the motor to position the ball for dividing the flow so as to achieve a desired solution application rate.

5 Claims, 5 Drawing Sheets

SPRAY APPLICATION RATE REGULATING VALVE

FIELD OF THE INVENTION

The present invention relates to agricultural sprayers and more specifically relates to valves for regulating the spray application rate of such sprayers

BACKGROUND OF THE INVENTION

Pumps used for delivering fluid to sprayer booms carrying dispensing nozzles are often positive displacement pumps which operate at a fixed speed, typically determined by the drive speed of the PTO of the tractor used for towing or carrying the sprayer. This creates a fixed volume of flow at all times that cannot be deadheaded. In order to control the rate at which fluid is delivered by the nozzles carried by a sprayer boom, a regulating valve is used for diverting a portion of the fluid delivered by the fixed displacement pump back to the fluid solution tank or reservoir. Currently available regulating vales are typically V-ball, butterfly, or poppet style valves. These styles only regulate in one line and cannot truly divide the flow.

SUMMARY OF THE INVENTION

According to the present invention, there is provided an improved regulating valve for controlling the spray solution application rate.

An object of the invention is to provide a relatively simple regulating valve which is capable of providing improved flow control to a sprayer boom by dividing the flow between a port coupled to the sprayer boom and a port coupled back to the tank containing the fluid spray solution. This object is attained by using a ball valve mounted in a valve housing for rotation about an adjustment axis centered in an inlet port of the housing and disposed crosswise to a second axis centered in respective boom and tank ports of the housing. The ball is in the form of a spherical shell provided with a first circular opening disposed in register with the inlet port, a second circular opening disposed in register with the boom port and an elongate wedge-shaped opening disposed in register with the tank port. By rotating the ball to desired locations about the adjustment axis, fluid flow is divided in selected amounts between the boom and tank ports so as to achieve a desired flow rate to the boom for producing a desired application rate through the nozzles carried by the boom.

One way of controlling the regulating valve is to couple the valve ball to an electric adjustment motor, with the latter being coupled to a computer which monitors pump displacement variables and determines the displacement of the pump and which monitors the flow rate of the spray solution flowing from the boom port of the regulating valve and sends a signal to control the position of the valve ball so as to achieve a desired flow rate for achieving the desired application rate of the solution.

DESCRIPTION OF THE PREFERRED EMBODIMENT

Figure 1:
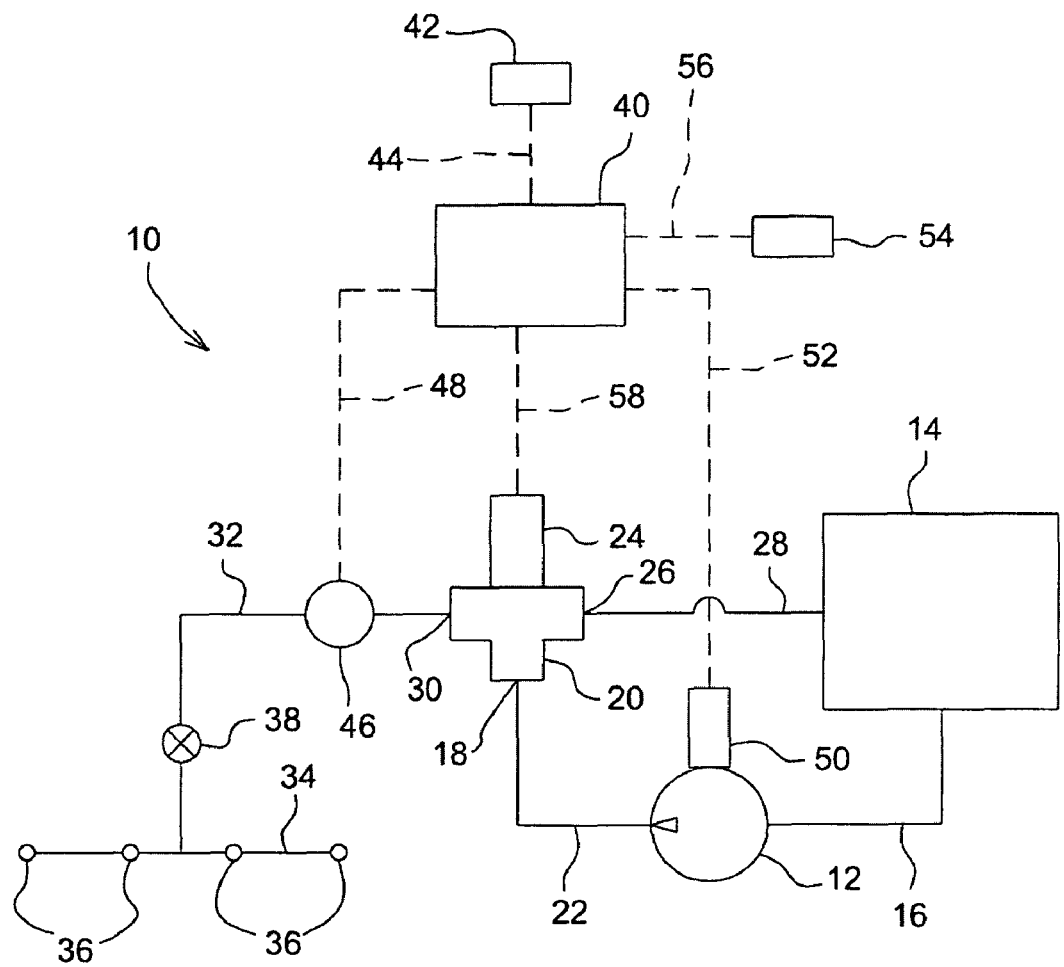
FIG. 1 is simplified schematic of an electro-hydraulic circuit containing a regulating valve, constructed in accordance with the principles of present invention, and electrical controls for the valve.

Referring now to FIG. 1, there is shown a electro-hydraulic flow regulating circuit 10. The circuit 10 includes a fixed displacement pump 12 having an inlet coupled to a spray solution tank 14 by a fluid conduit 16 and having an outlet coupled to an inlet port 18 of a flow regulating valve 20 by a fluid conduit 22. Associated with the flow regulating valve 20 is an electric motor 24 for adjusting the valve 20, in a manner described below, so as to divide the flow entering the inlet port 18 between a bypass port 26, which is connected to the tank 14 by a conduit 28, and a boom port 30, which is coupled to a conduit 32 leading to a spray boom 34 equipped with a plurality of nozzles 36. Located in the conduit 32 just upstream of the boom 34 is a shut-off valve 38.

An electrical controlling unit, shown here as a programmable computer 40, is provided for controlling operation of the electric motor 24. A key pad 42 for inputting a desired spray solution application rate into the memory of the computer 40 is coupled to the computer by a first input lead 44. For determining the actual application rate, an electrical flow rate signal, generated by a flow sensor 46, located in the conduit 32, is provided to the computer 40 over a lead 48, an electrical pump speed signal, generated by a pump speed sensor 50, is coupled to the computer 32 over a lead 52, and an electrical ground speed signal, generated by a ground speed sensor 54, is coupled to the computer over a lead 56. The computer 40 acts in response to the solution flow, pump speed and vehicle ground speed signals to derive an actual application rate which is compared with the desired application rate stored in memory and sends a control signal to the electric motor 18, over a lead 58, with the motor 18 acting in response to this control signal for adjusting the flow control valve appropriately for causing the correct amount of solution to be delivered to the boom 24 for achieving the desired application rate.

Figure 2:
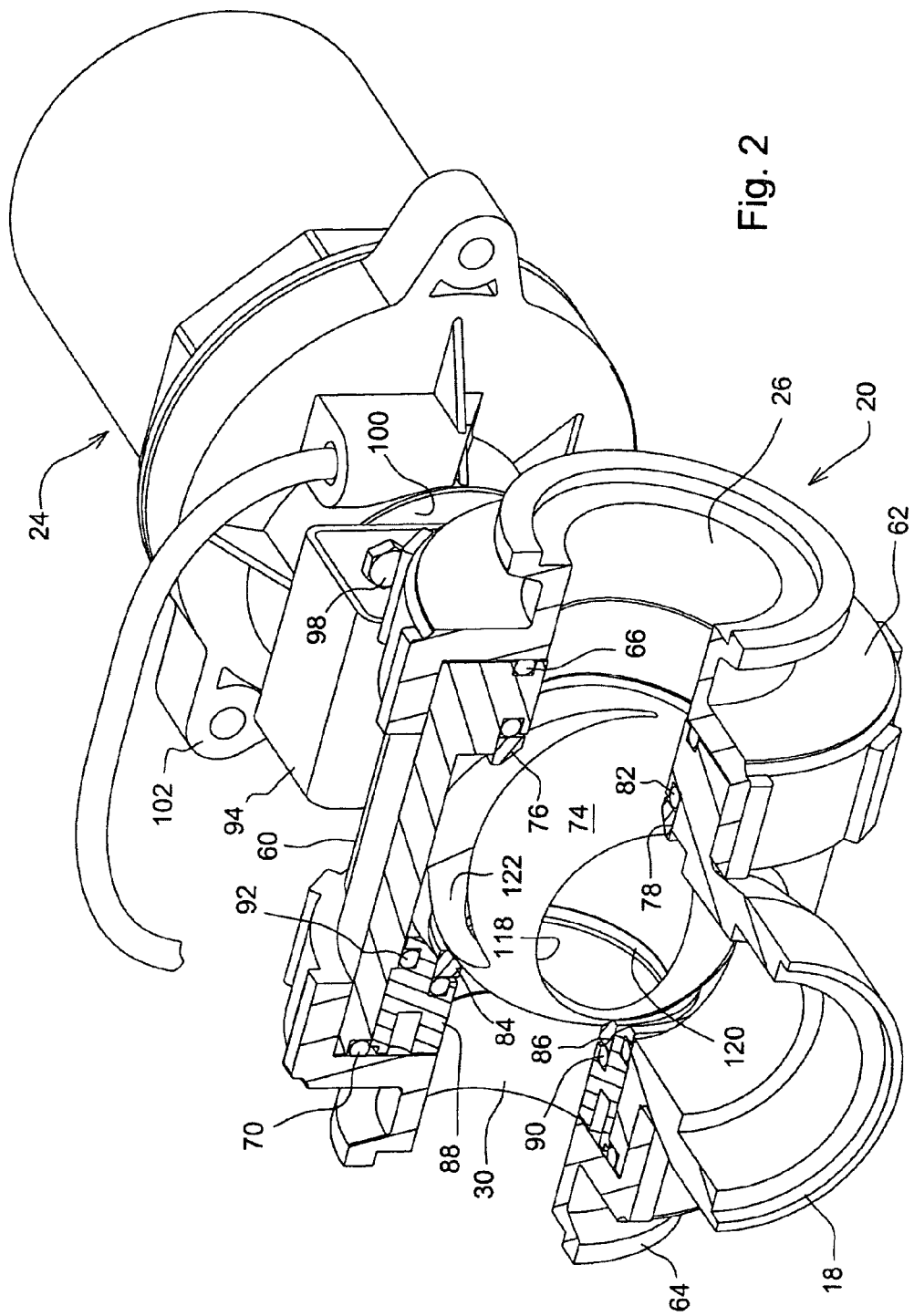
FIG. 2 is a perspective view of the combined valve adjusting motor and solution regulator valve, with a section of the valve body removed for exposing the valve ball, with the latter being shown in an intermediate position dividing inlet port flow between bypass and boom ports of the valve body.
Figure 3:
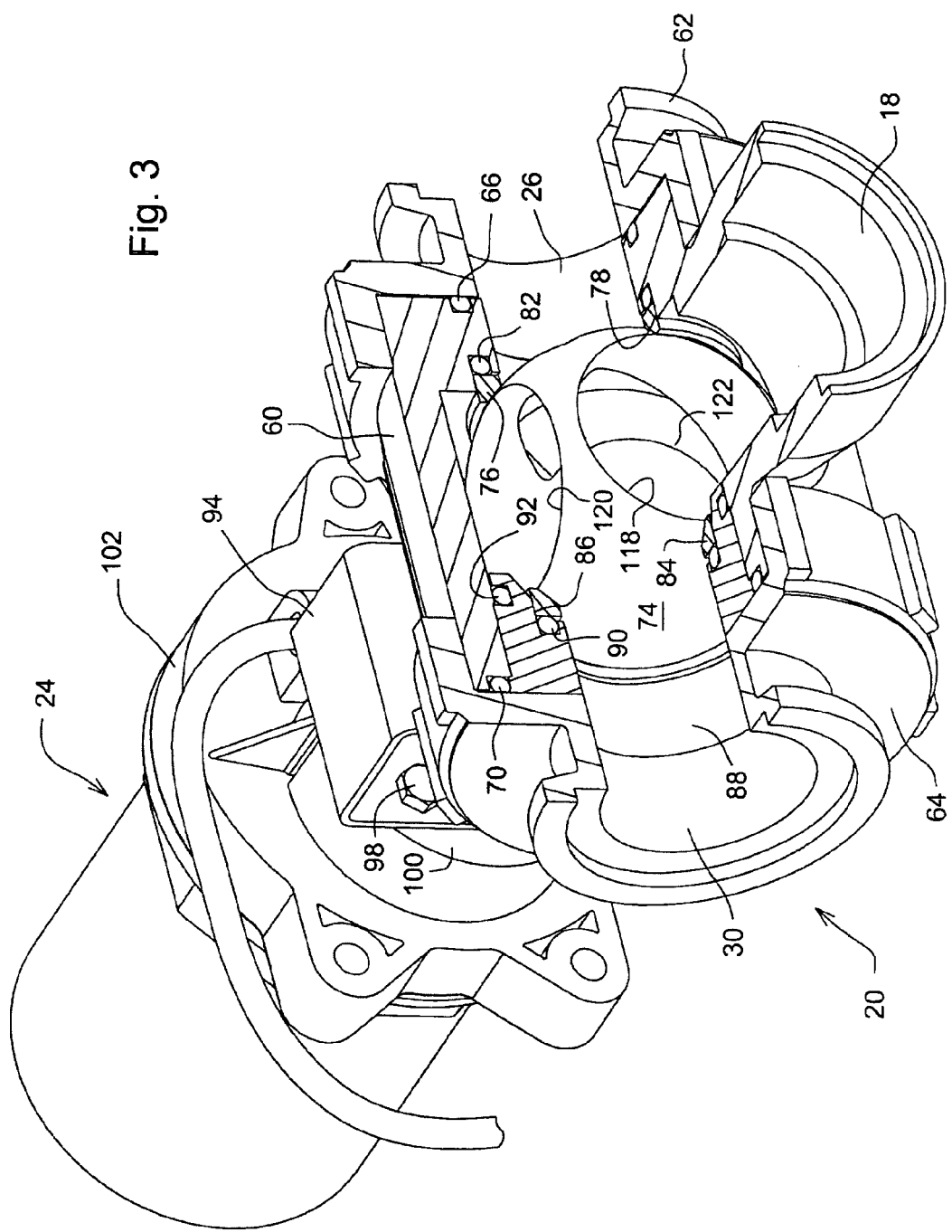
FIG. 3 is a view like that of FIG. 2, but taken from a view point displaced 90° and showing the valve ball in a position for effecting maximum flow to the bypass port.
Figure 4:
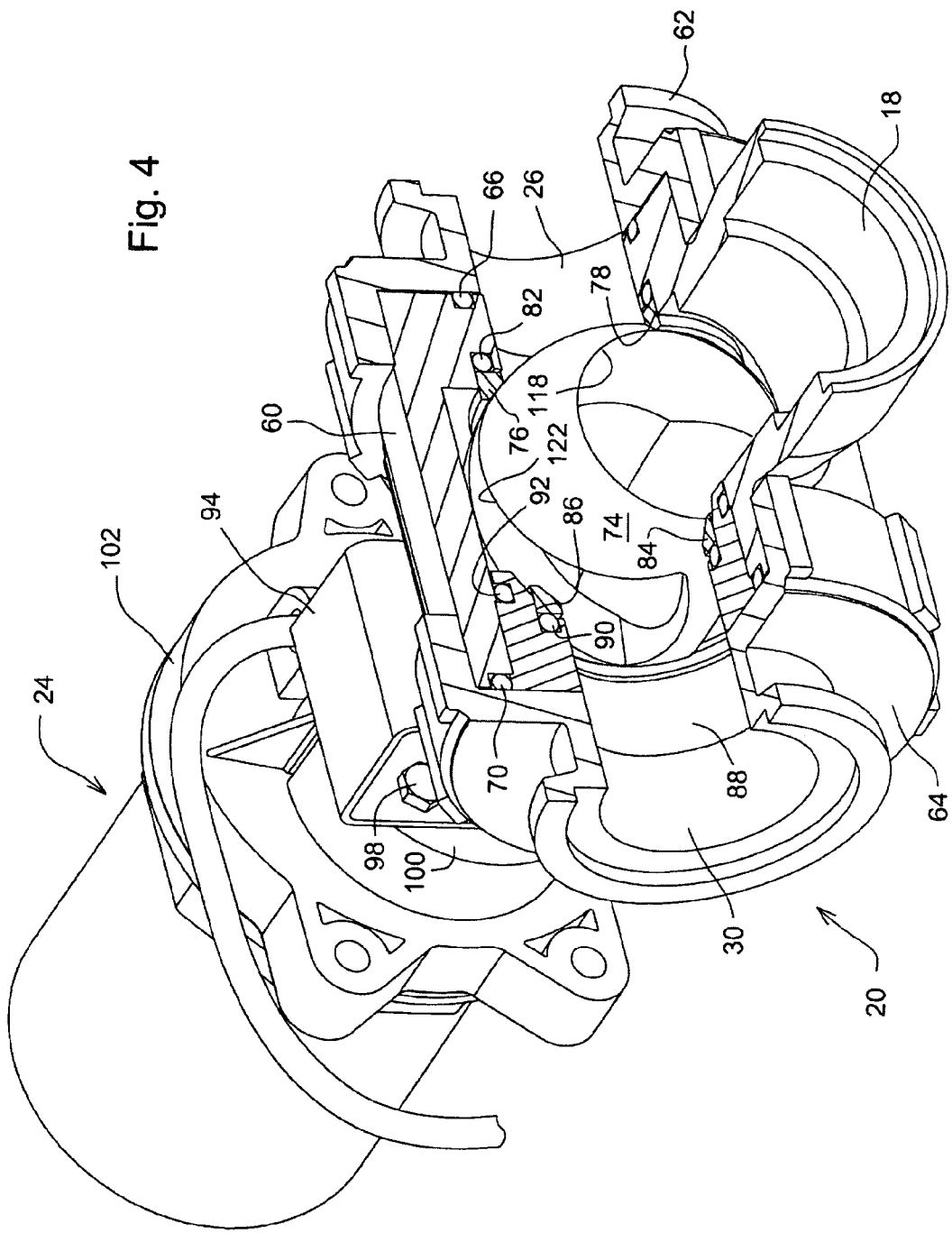
FIG. 4 is a view like that of FIG. 2 but showing the valve ball in a position for effecting maximum flow to the boom port.

Referring now to FIGS. 2-4, it can be seen that the flow regulator valve 20 includes a central, tubular T-shaped valve body 60, with the stem of the T having an end defining the input port 18, and with the top of the T having an exteriorly threaded right end receiving a right, internally threaded end cap 62, which defines the bypass port 26, and having an exteriorly threaded left end receiving a left, internally threaded end cap 64 defining the boom port 30. Leakage at the interface of the end cap 62 and the right end of the valve body 60 is prevented by an o-ring 66 located in an annular recess provided in the right end face of the valve body 60 and engaged by an annular, leftwardly facing surface of the end cap 62. Similarly, leakage at the interface of the end cap 64 and the left end of the valve body 60 is prevented by an o-ring 70 located in an annular recess provided in the left end face of the valve body 60 and engaged by an annular, rightwardly facing surface of the end cap 64.

Disposed centrally within the valve body 60 is a hollow, spherical valve ball 74, which, as viewed in FIGS. 2-4, has its right side seated against an annular, right valve seat 76 positioned within an annular recess 78 formed within a right end section of the valve body and being joined to an o-ring groove containing an o-ring 82 for preventing flow across the interface between the right valve seat 76 and the valve body 60. The left side of the ball 74 is seated against an annular left valve seat 84 positioned within an annular recess 86 formed within a right end of an adjusting nut 88 having exterior threads engaged with interior threads at a left end region of the valve body 60. Leakage along the interface between the valve seat 84 and the adjusting nut 88 is prevented by an o-ring 90 which is received in an o-ring groove joined to the recess 86. An o-ring groove is formed in the exterior of the adjusting nut 88, just rightward of its exterior threads, and contains an o-ring 92 for preventing leakage across the engaged threads of the nut 88 and valve body 60.

It is noteworthy that the spherical valve ball 74 can be made two inches in diameter, which is a relatively large valve size having the advantage of being able to meter a relatively large flow making it possible to use only one regulating valve for effectively dividing flow for both single and double pump systems. Furthermore, using one regulating valve to divide the flow also creates a smaller package by eliminating the need for providing elements in the control system for coordinating two regulating valves.

Figure 5:
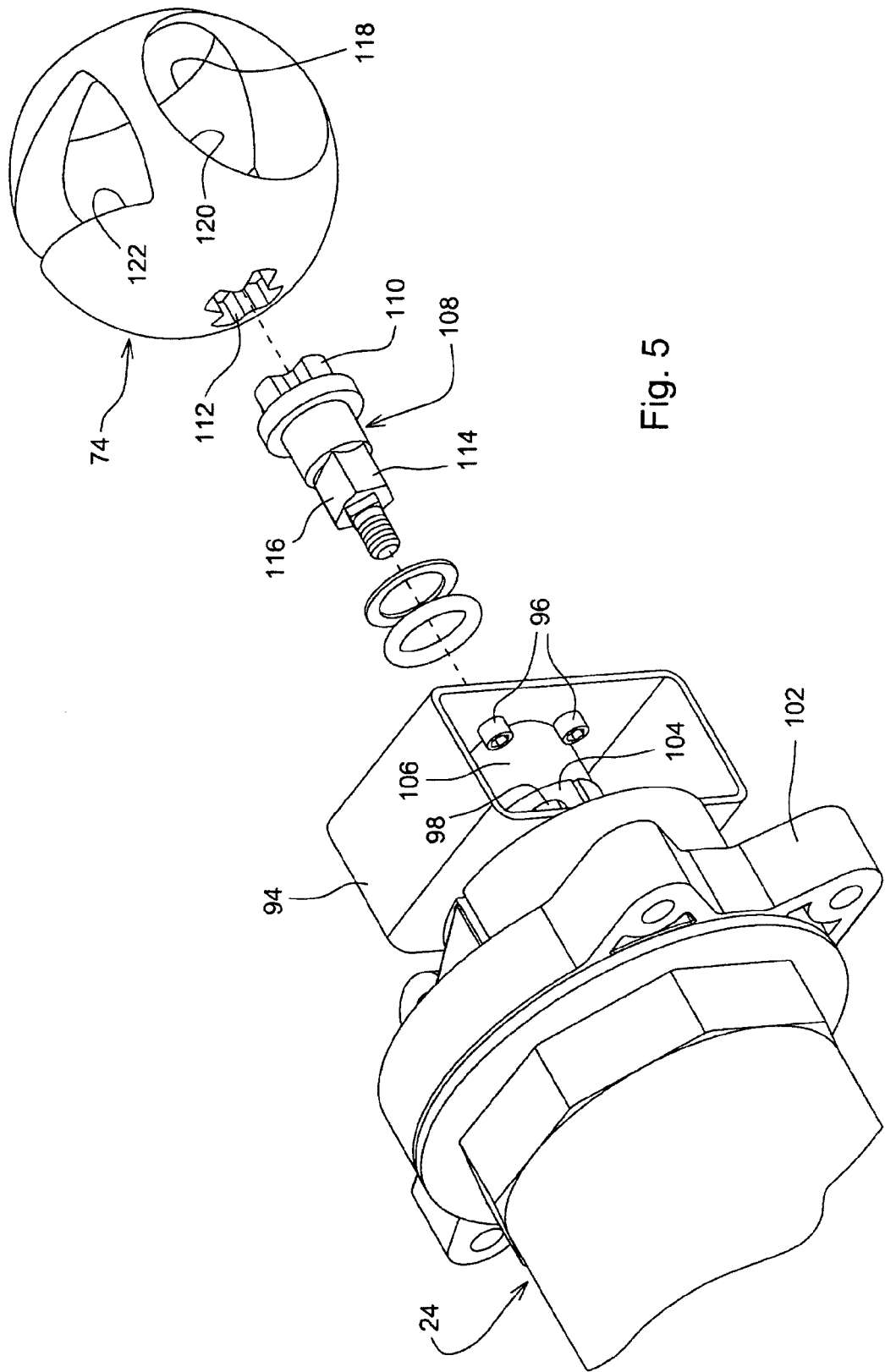
FIG. 5 is an exploded view showing the valve ball and the drive spindle for the ball.

Referring now also to FIG. 5, it can be seen that the electric motor 24 is mounted to the valve body 60 through the agency of a mounting bracket 94, which is formed by a short piece of tubing having a rectangular cross-section. Opposite sides of the bracket 94 are respectively provided with circular openings (not shown) that are in axial alignment with each other, with one of the opposite sides being mounted, as by fasteners 96, tight against a flat annular surface (not shown) provided on the valve body 60 in axial alignment with, and on the opposite side of the valve body from, the inlet port 18. The opposite side of the bracket 108 is mounted, as by fasteners 98, tight against a flat annular surface 100 provided on a base 102 of the motor so as to surround a cylindrical projection 104 of the base, with the projection 104 being located in the opening provided in the last-mentioned bracket side. A drive shaft 106 of the motor 24 is mounted in the cylindrical projection 104 and has a free end section that projects through the opening provided in the bracket side that is fixed to the valve body 60. The free end section of the motor drive shaft 106 forms a substantially hexagonal drive socket, the drive surfaces of which are not shown.

Forming a driving connection between motor drive shaft 106 and the spherical valve ball 74 is a drive spindle 108, which is mounted for rotation within a cylindrical bore (not shown) extending to an interior of the valve body 60 from the bracket mounting surface of the valve body 60. The drive spindle 108 includes an end defined by a first drive section 110 having the shape of a plus sign, as viewed facing the section 110 in the axial direction of the spindle 108. The valve ball 74 contains a receptacle 112 shaped complementary to and receiving the spindle drive section 110. The spindle 108 is provided with a second drive section 114 shaped complementary to, and received within the drive socket end section of the motor drive shaft 106. As can be seen in FIG. 5, portions of adjacent sides of the second drive section 114 have been removed to form a flat 116 which mates with a corresponding flat provided in the socket end section of the motor drive shaft 106 so as to time the motor shaft to a desired orientation of the spherical valve ball 74, as is described below.

The spherical valve ball 74 is provided with a first circular opening 118 that is always in axial alignment with the valve body inlet port 18 since the valve ball 74 rotates about the central axis of the inlet port 18, noting that the drive spindle 108 lies along this axis.

As shown in FIG. 2, the valve ball 74 is positioned so that a second circular opening 120 of the ball is axially aligned with the boom port 30, while a small end section of a wedge-shaped opening 122, that extends lengthwise about the axis of rotation of the ball, is in fluid communication with the bypass port 26. This is an intermediate position of the valve ball 74.

As shown in FIG. 3, the valve ball 74 is positioned 90° clockwise from its position shown in FIG. 2. This is a first extreme position which establishes a maximum flow through the bypass port 26 and no flow through the boom port 30, with it being noted that the second circular opening 120 is now oriented so that the valve seats 76 and 84 prevent flow from the opening 120 to both the bypass port 26 and the boom port 30, while all but a small portion of the small end of the wedge-shaped opening 122 is in fluid communication with the bypass port 26.

As shown in FIG. 4, the valve ball 74 is positioned 55° counterclockwise from its position shown in FIG. 2. This is a second extreme position which establishes a maximum flow through the boom port 30, with it being noted that in this position flow to the bypass port 26 is completely blocked while a major cross section of the wedge-shaped opening 122 and a minor cross section of the second circular opening 120 are in fluid communication with the boom port 30.

In operation, the a desired solution application rate is programmed into computer 40 through operation of the key pad 42. Once the sprayer is towed or driven to a field where the solution is to be applied, the shut-off valve 38 is opened for permitting flow to the sprayer boom 34. With the electrical system being energized, a control signal, corresponding to the desired solution rate, is sent from the computer 40 to the electric motor 24 for causing it to move the valve ball 74 to an initial position corresponding to that for bypassing that amount of the solution necessary for there to remain the correct quantity passing through the boom port 30 for effecting the desired application rate. With the initial position of the valve ball 74 being set, the drive for the pump 12 is initiated, and maintained at a desired speed, with the sprayer being propelled or towed at a desired ground speed.

Fluid delivered by the pump 12 enters the inlet port 18 of the spray regulator valve 20 and is divided between the bypass port 26 and boom port 30 in accordance with the initial setting of the valve ball 74.

During operation, the pump drive speed is monitored by a sensor 50, the sprayer ground speed is monitored by a ground speed sensor 54 and the fluid pressure of the flow passing from the sprayer port is monitored by the pressure sensor 46, with these sensors each sending to the computer 40 a signal corresponding to the amount sensed. These signals are used to calculate an actual solution application rate which is compared with the desired application rate, with the difference between the two rates causing a corresponding output signal to be generated and sent to the regulator valve control motor 24 which acts to cause the valve ball 74 to be repositioned in the correct direction for effecting the desired application rate. For example, assuming the valve ball 74 to be located in an initial, intermediate position between the extreme positions shown in FIGS. 3 and 4, and the calculated actual spray rate is less than the pre-selected desired spray rate, the output signal sent to the motor 24 will cause it to rotate the valve ball 74 counterclockwise so as to cause less of wedge shaped opening 122 in the valve ball 74 to be exposed to the bypass port 26, while increasing the area of the circular opening 120 alone, or the combined areas of the circular opening 120 and the wedge shaped opening 122, exposed to the boom port 30.

On the other hand, assuming the same initial, intermediate position of the valve ball 74 results in the calculated actual spray rate being more that the pre-selected desired spray rate, the output signal sent to the motor 24 will cause it to rotate valve ball 74 clockwise so as to increase the area of the wedge-shaped opening 122 of the ball 74 exposed to the bypass port 26 while decreasing the area of the circular opening 120 alone, or the combined areas of circular opening 120 and wedge-shaped opening 122, exposed to the boom port 30.

Thus, as the bypass port 26 is opened or exposed to an increasing area of the wedge-shaped opening 122, the boom port 30 is closed or exposed to a decreasing area of the circular opening 120, alone or together with the wedge-shaped opening 122. Due to the wedge-shaped opening 122 being elongated, flow control is improved and valve sensitivity is reduced. In other words, the valve response is reduced for each degree of movement, allowing the control system to feather the valve ball 74 more smoothly. Combining this elongated wedge-shaped valve opening 122 with the relatively large two inch valve size allows the valve ball 74 to effectively meter flow for both a system utilizing a single pump, as shown, or a system utilizing two pumps. Further, by using but a single regulator valve 20 to divide the flow makes it possible to create a smaller control system package than would be required by a system utilizing two conventional regulator valves and a control device for coordinating the two regulator valves.

Although, the valve ball 74 is shown provided with the circular opening 120 and the wedge-shaped opening 122, it should be understood that openings of other configurations are possible so long that they function to produce the desired flow dividing and feathering characteristic.

Having described the preferred embodiment, it will become apparent that various modifications can be made without departing from the scope of the invention as defined in the accompanying claims.

The invention claimed is:

1. A spray rate regulator valve, comprising: a valve body having an inlet port, adapted for connection to a constant flow of liquid spray solution, having a bypass port, adapted for connection to a solution tank, and having a boom port, adapted for connection to a spray boom, a hollow, spherical valve ball mounted in said valve body for rotation about a rotation axis aligned with said inlet port and having a first opening leading to an interior of said ball and being of a circular configuration centrally located on said axis; said valve ball being provided with second and third openings leading to said interior of said ball and being so located relative to said bypass and boom ports that, when said valve ball is in a first extreme position, flow is permitted only between said inlet port and said boom port, when said valve ball is in a second extreme position, flow is permitted only between said inlet port and said bypass port, and when said valve ball is in an intermediate position between said first and second extreme positions, flow is divided between said bypass and boom ports, with the flow from said boom port increasing and the flow from said bypass port decreasing as said valve ball moves toward said first extreme position from said intermediate position, and with the flow from said bypass port increasing and the flow from said boom port decreasing as said valve ball is moved toward said second extreme position.

2. The spray rate regulator valve, as defined in claim 1, wherein said bypass and boom ports are located along a second axis extending orthogonally to said rotation axis; said third opening being elongated and centered relative to a plane containing said second axis and extending perpendicular to said rotation axis; and said third opening being located for permitting flow only between said inlet port and said bypass port when said valve ball is in said second extreme position.

3. The spray rate regulator valve, as defined in claim 1, wherein said bypass and boom ports are located along a second axis extending orthogonally to said rotation axis and said second opening being a circular opening centered on said second axis when said valve ball is in said intermediate position.

4. A spray rate regulator valve, comprising: a valve body having an inlet port, adapted for connection to a constant flow of liquid spray solution, having a bypass port, adapted for connection to a solution tank, and having a boom port, adapted for connection to a spray boom, a hollow, spherical valve ball mounted in said valve body for rotation about a rotation axis aligned with said inlet port and having a first circular opening leading to an interior of said ball and being centrally located on said axis; said valve ball being provided with a second circular opening leading to said interior of said ball and being centered on a second axis disposed at a right angle to said rotation axis, and an elongated opening being centered relative to a plane extending perpendicular to said rotation axis, with said elongated opening having a first end spaced a few degrees about said rotation axis from said second circular opening and extending from said first end to a second end located approximately at said second axis.

5. The regulator valve, as defined in claim 1, wherein said elongated opening is a wedge-shaped opening with said first end being a large end of said wedge-shaped opening.

\* \* \* \* \*